(12) United States Patent
Perosino et al.

(10) Patent No.: US 10,286,756 B2
(45) Date of Patent: May 14, 2019

(54) AIR OUTLET DEVICE, IN PARTICULAR FOR THE SUPPLY OF AIR INTO A PASSENGER COMPARTMENT OF A MOTOR VEHICLE

(71) Applicant: C.R.F. Societa' Consortile per Azioni, Orbassano (IT)

(72) Inventors: Andrea Perosino, Orbassano (IT); Fabrizio Mattiello, Orbassano (IT); Giorgio Masoero, Orbassano (IT); Tiziana Virdis, Orbassano (IT); Stefano Bernard, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 93 days.

(21) Appl. No.: 15/367,394

(22) Filed: Dec. 2, 2016

(65) Prior Publication Data

US 2017/0158028 A1  Jun. 8, 2017

(30) Foreign Application Priority Data

Dec. 4, 2015  (EP) .................................... 15198128

(51) Int. Cl.
*B60H 1/34*  (2006.01)

(52) U.S. Cl.
CPC ........... *B60H 1/345* (2013.01); *B60H 1/3442* (2013.01); *B60H 2001/3464* (2013.01)

(58) Field of Classification Search
CPC ...................................................... B60H 1/345

USPC ........................................................ 454/152
See application file for complete search history.

(56) References Cited

U.S. PATENT DOCUMENTS

| | | | | |
|---|---|---|---|---|
| 3,744,724 A | * | 7/1973 | Caille | .................... F24F 13/068 |
| | | | | 239/553.5 |
| 5,791,985 A | * | 8/1998 | Schiedegger | ............. F24F 7/02 |
| | | | | 454/339 |
| 2017/0036508 A1 | * | 2/2017 | Terasawa | ............. B60H 1/3442 |

FOREIGN PATENT DOCUMENTS

| | | |
|---|---|---|
| DE | 10 2014 009 850 A1 | 12/2014 |
| EP | 1 690 707 A1 | 8/2006 |
| GB | 487023 A | 6/1938 |
| GB | 768139 A | 2/1957 |

* cited by examiner

*Primary Examiner* — Steven B McAllister
*Assistant Examiner* — Allen R Schult
(74) *Attorney, Agent, or Firm* — Blank Rome LLP

(57) ABSTRACT

An air outlet device has a supporting structure suitable for communicating, in use, with an air ventilation system, and an outlet member that is configured so as to supply an air flow along an outlet axis and is coupled to the supporting structure so as to rotate by 180° about a joint axis orthogonal to the outlet axis, to assume two opposite configurations. The outlet member comprises a plurality of deflecting walls defining a plurality of air ducts, which are arranged about the outlet axis and distributed axially in sequence. The deflecting walls are shaped and/or positioned so as to guide the air in the air ducts in directions having a radial component. At least one of the deflecting walls has a series of through-holes made in positions that are spaced apart about the outlet axis.

11 Claims, 3 Drawing Sheets

200
AIR OUTLET DEVICE, IN PARTICULAR FOR THE SUPPLY OF AIR INTO A PASSENGER COMPARTMENT OF A MOTOR VEHICLE

The present invention relates to an air outlet device, in particular for the supply of air into a passenger compartment of a motor vehicle.

BACKGROUND OF THE INVENTION

As is known, motor vehicles are provided with a dashboard on which there are an instrument panel, object compartments, and a plurality of air outlet devices configured to supply and direct air into the passenger compartment.

The need is felt for an air outlet device that can be configured in a relatively simple manner to deliver a concentrated air flow or a diffused air flow, according to the needs of the driver and of the passengers.

For that purpose, document GB487023A, which corresponds to the preamble of claim 1, describes an air outlet device having a tapered nozzle that is rotatable, by means of a ball joint, so as to be convergent to or divergent from the passenger compartment and thus generate, respectively, a concentrated or diffused air current. To generate the diffused air current, a mushroom-shaped element is fitted to the widest end of the nozzle to divert the air to the side. Said mushroom-shaped element is also movable along the axis of the nozzle so as to close it.

However, this solution is not very satisfactory, as the mushroom-shaped element obstructs the flow of air that must enter the nozzle in the concentrated air flow configuration, or the flow of air that must flow out of the nozzle in the diffused air flow configuration. Moreover, rotating the nozzle in the ball joint by 180° to obtain the two configurations is rather complicated.

SUMMARY OF THE INVENTION

The purpose of the present invention is to provide an air outlet device, in particular for the supply of air into a passenger compartment of a motor vehicle, which overcomes the problems described above in a simple and economical manner, and preferably consists of a relatively small number of parts and allows the air flow to be directed, regardless of whether said air flow is diffused or concentrated.

According to the present invention there is provided an air outlet device, in particular for the supply of air to a passenger compartment of a motor vehicle, as described and claimed below.

BRIEF DESCRIPTION OF THE DRAWINGS

In order to better understand the present invention, a non-limiting preferred embodiment thereof will now be described by way of example with reference to the accompanying drawings, in which.

DETAILED DESCRIPTION OF THE INVENTION

Figure 1:
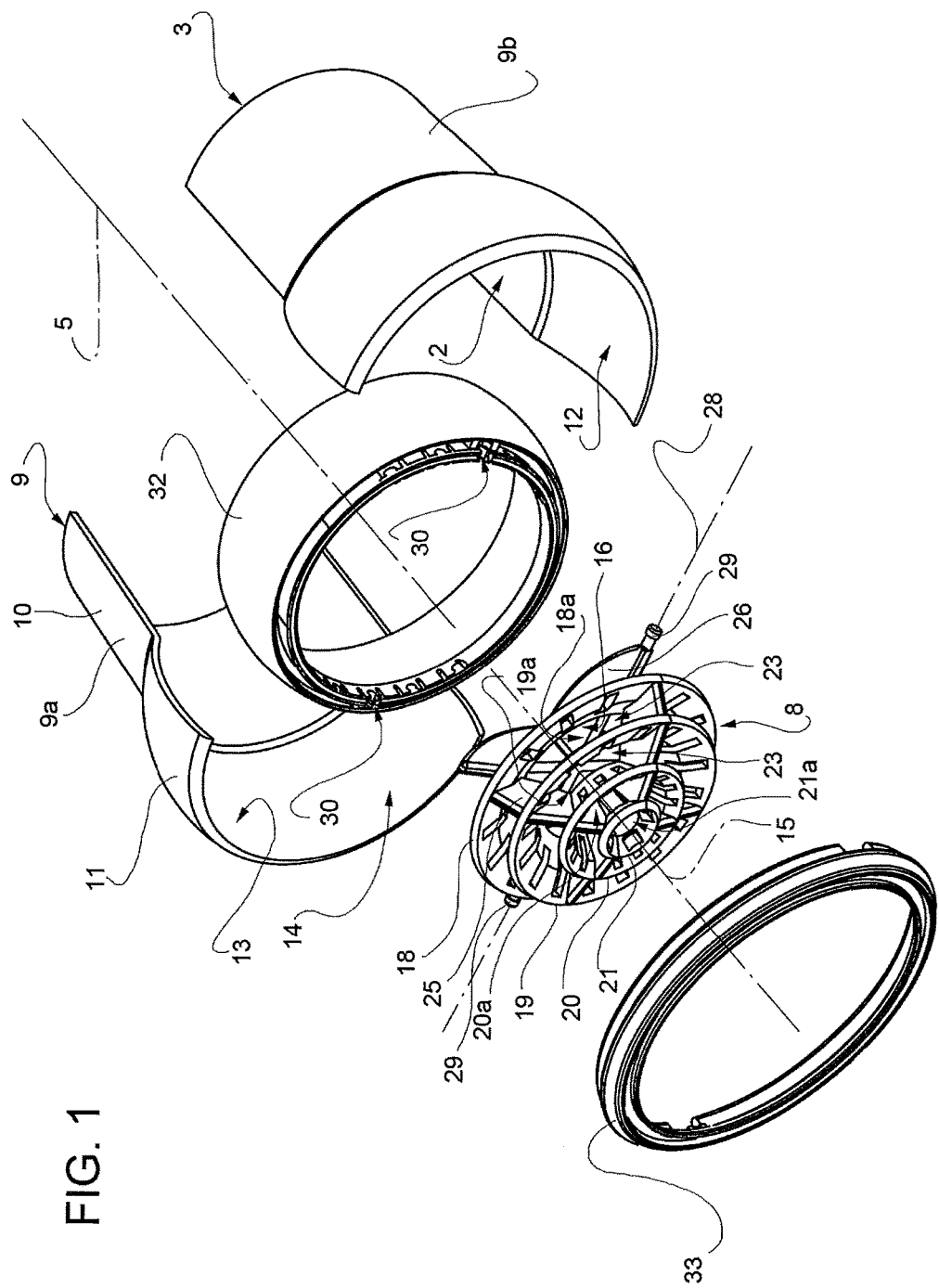
FIG. 1 is a perspective side view, with parts in an exploded view, of a preferred embodiment of the air outlet device, in particular for the supply of air to a passenger compartment of a motor vehicle, according to the present invention.

In FIG. 1, reference numeral 1 indicates an air outlet device, in particular for the supply of air to a passenger compartment (not shown) of a motor vehicle.

The outlet device 1 defines an air duct 2, which starts from a rear inlet 3 communicating, in use, with a ventilation and air conditioning system (not shown) in order to receive an air flow along an axis 5. The air duct 2 ends in an outlet 7 (FIG. 2 and FIG. 3) defined by a rotating member 8.

The outlet device 1 comprises a supporting structure 9, which preferably consists of two half-shells 9a and 9b, fixed one to the other in a manner that is not described in detail. The structure 9 comprises two opposite end portions indicated by reference numerals 10 and 11: the portion 10 defines the inlet 3 and an end part 12 of the air duct 2; on the other hand, the portion 11 defines a seat 13 that is part of a coupling device 14 for coupling the member 8 to the structure 9.

The member 8 comprises a plurality of deflector walls, for instance four deflector walls, indicated by reference numerals 18, 19, 20 and 21. The walls, 18, 19, 20 and 21 are ring-shaped and coaxial along an axis 15, corresponding to the direction along which the air flow is delivered through the outlet device 1. The walls 18, 19, and 21 extend transversely to the axis 15 and are axially spaced from one another. Preferably, the walls 18, 19, 20 and 21 have a geometrically identical ring shape that is defined, in particular, by a circular ring.

The internal perimeter edges of the walls 18, 19, 20 and 21 radially delimit a central axial air duct 16, which is preferably open at both of the axial ends of the member 8. The diameters of the internal perimeter edges of the walls 18, 19, 20 and 21 progressively decrease along the axis 15, so that the air duct 16 also has a decreasing diameter. The diameters of the external perimeter edges of the walls 18, 19, 20 and 21 also progressively decrease along the axis 15, so that the walls 18, 19, 20 and 21 form a substantially cone-shaped or pyramid-shaped structure.

The walls 18, 19, 20 and 21 have respective front faces 18a, 19a, 20a and 21a (FIG. 1 and FIG. 2), facing towards the tip of the substantially cone-shaped or pyramid-shaped structure, and respective rear faces 18b, 19b, 20b and 21b (FIG. 3) facing the opposite direction.

Advantageously, each of the front faces 18a 19a, and 21a has an internal perimeter area that directly faces, parallel to the axis 15, an external perimeter area of the rear face 19b, 20b and 21b of the next wall (working towards the tip of the substantially cone-shaped or pyramid-shaped structure), so that each of the walls 19 and 20 partially overlaps the next wall and the previous wall.

Preferably, the member 8 further comprises a plurality of spokes 25, for example four, which join the walls 18, 19, 20 and 21 to one another.

The front faces 18a, 19a and 20a, the rear faces 19b, 20b and 21b and the spokes 25 delimit between them a plurality of air ducts 23 (FIG. 1), arranged in sequence along the axis 15 and arranged about the axis 15 along the entire perimeter of the member 8, and convey the air that is guided by the shape and/or by the position of the walls 18, 19, 20 and 21 along respective guiding directions each of which has at least a radial component.

The air ducts 23 thus form respective layers or annuli in the aforesaid cone-shaped or pyramid-shaped structure. Said layers or annuli of air ducts are coaxial and cascaded with respect to one another along the axis 15. As is apparent from the accompanying figures, the layers or annuli of air ducts have respective average diameters of decreasing size.

In particular, the spokes 25 are defined by plates which divide the empty spaces into sectors and thus separate each air duct 23 from the adjacent ones in a circumferential direction. In particular, said plates are parallel to the axis 15.

The air ducts 23 have respective radially internal end openings, in correspondence with the air duct 16, and respective radially external end openings, defining an inlet or an outlet for the air with a radial component in the guiding direction.

According to one aspect of the present invention, with reference to FIG. 1, the member 8 is rotatable with respect to the structure 9 so as to assume a first and a second configuration, rotated by 180° in relation to one another about an axis 28 that is orthogonal to the axis 15.

In the first configuration (FIG. 2), the front faces 18a, 19a, 20a and 21a face towards the passenger compartment, that is to say, towards the outside of the air duct 2. At the same time, the air ducts 23 convey an air flow from the air duct 16 with a radial component towards the outside, so that a diffused air flow is delivered through the outlet 7. In particular, the air coming from the inlet 3 along the axis 5 comes into contact with the internal perimeter areas of the rear faces 19b, 20b and 21b and is diverted by said internal perimeter areas into the air ducts 23 and, by the latter, with a radial component towards the outside.

In the second configuration (FIG. 3), the front faces 18a, 19a, 20a and 21a face towards the inside of the air duct 2. At the same time, the air ducts 23 convey an air flow with a radial component from the outside towards the air duct 16, so that said flow is concentrated in the air duct 17, which thus defines the outlet 7. In particular, the air coming from the inlet 3 along the axis 5 comes into contact with the external perimeter areas of the front faces 18a, 19a and 20a and is diverted by said external perimeter areas into the air ducts 23 and, by the latter, radially towards the inside of the air duct 16, and then flows along the axis 15 around the tab 26.

Advantageously, one or more walls 18, 19, 20 and 21 is sloping or tapered with respect to the axis 15, in order to guide the air along directions also having an axial component, in correspondence with the radially internal end openings and/or in correspondence with the radially external end openings of the air ducts 23. In this way, for instance, in the second configuration with the concentrated air flow the introduction of the air into the air ducts 23 and/or the axial channeling from the air ducts 23 to the air duct 16 are facilitated, so that the air flow meets less resistance.

In particular, one or more walls 18, 19, 20 and 21 are shaped so as to comprise two concentric portions joined to one another and having a respectively different slope or taper, so as to optimise the guiding effect and thus reduce the resistance to the air flow to a minimum. Generally speaking, the walls 18, 19, 20 and 21 may have differently shaped generatrices, which may be more or less effective: for example, according to alternative embodiments that are not shown, the walls 18, 19, 20 and 21 may extend, partially or completely, orthogonal to the axis 15.

Figure 2:
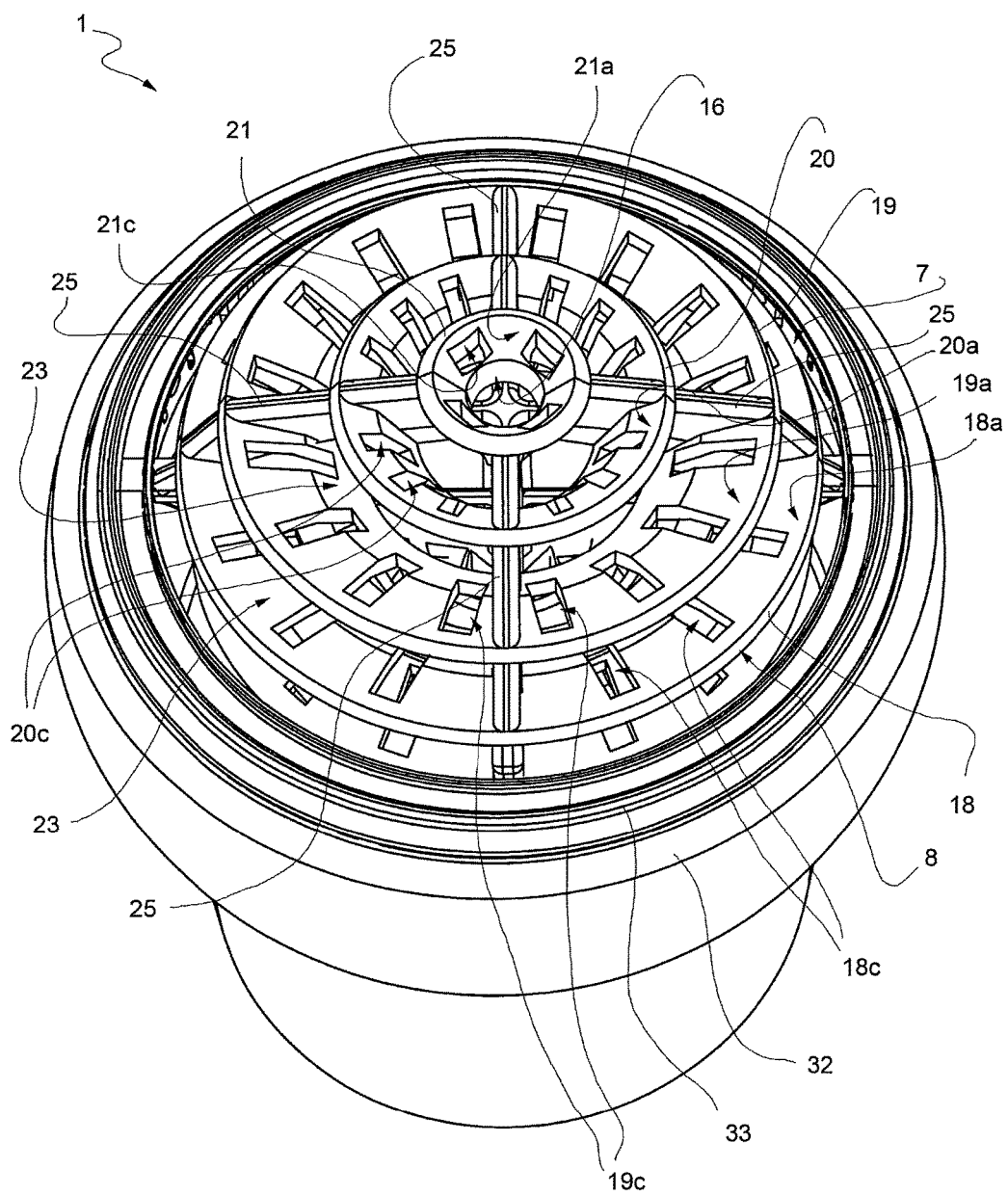
FIG. 2 is a front perspective view of the outlet device of FIG. 1, with the parts assembled.

With reference to FIG. 2, advantageously, at least one of the walls 18, 19, 20 and 21 has a respective series of through holes (18c, 19c, 20c and 21c) in order to further reduce the resistance to the air flow. The holes in each wall 18, 19, 20 and 21 are spaced apart about the axis 15 and angularly staggered with respect to the holes in the immediately preceding and/or immediately following wall along the axis 15, so as not to create preferential channeling in the axial direction that would prevent the air from flowing through the air ducts 23 with the radial direction component.

Figure 3:
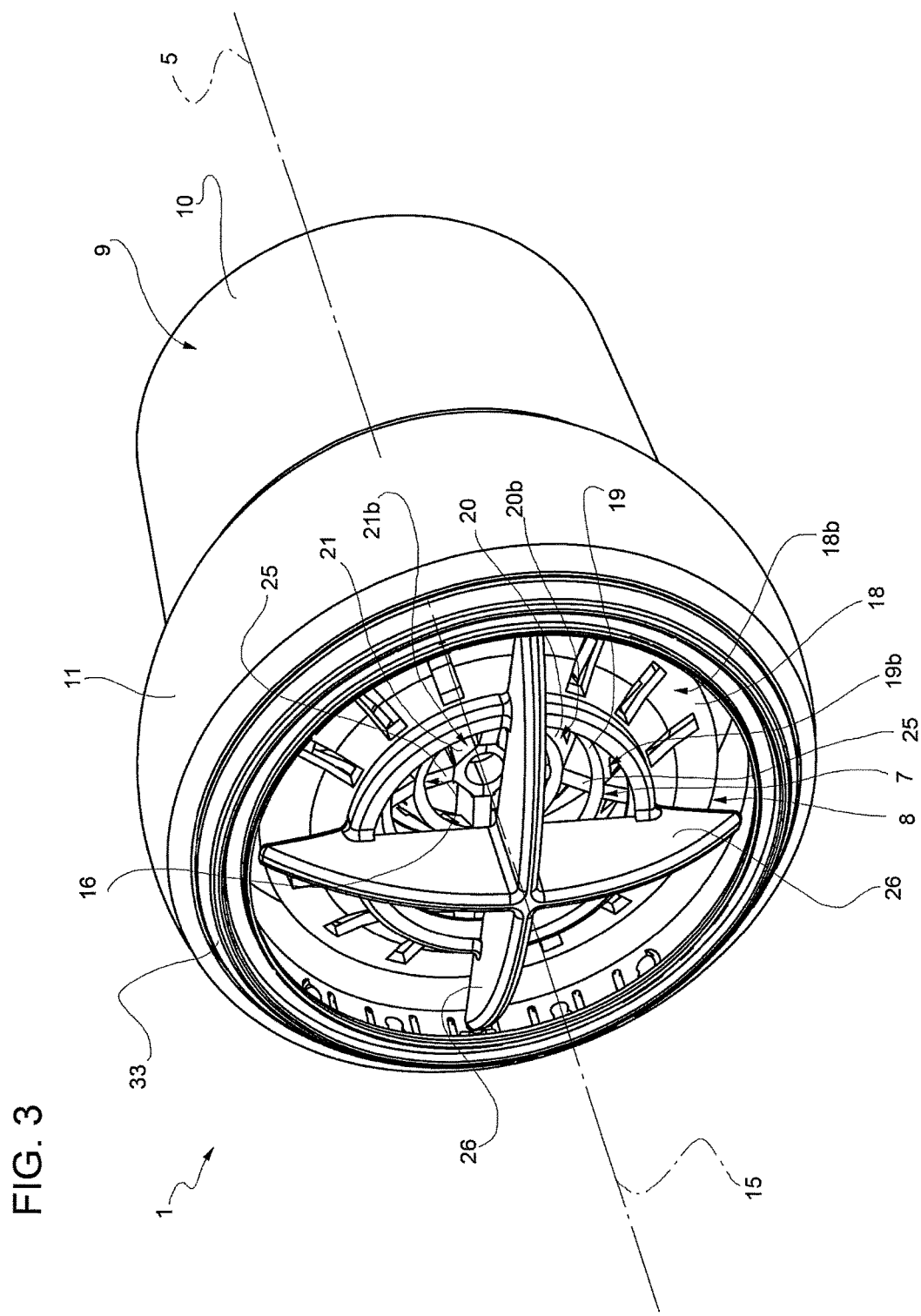
FIG. 3 shows the outlet device of FIG. 2 in a different operating configuration and from a different perspective.

With reference to FIG. 3, the member 8 further comprises at least one tab 26, for example a cross-shaped tab, which projects axially from the rear face 18b of the ring 18 (i.e. the face having the greatest diameter, at the base of the substantially cone-shaped or pyramid-shaped structure). The purpose of the tab 26 is to optimise the axial guiding effect at the end of the member 8 and/or to provide an element that the user can grip, for example to manually rotate the member 8 with respect to the structure 9. Advantageously, the tab 26 is axially aligned with the spokes 25.

Preferably, as shown in FIG. 1, to obtain the rotation between the first and the second configuration, the device 14 comprises two hinge elements 29, which are part of the member 8 and are arranged along the axis 28 in diametrically opposite positions with respect to the axis 15.

In particular, the hinge elements 29 are defined by respective projecting pins, which axially and rotatingly engage respective hinge seats 30 borne by the portion 11 of the structure 9. Nonetheless, other joint systems (for example ball joints) may be used to permit the member 8 to rotate between the first and the second configuration and define the air flow as diffused or concentrated.

Advantageously, the device 14 comprises a collar 32, to which the member 8 is hinged about the axis 28. The collar 32 is housed in the seat 13 and is coupled to the portion 11 so that its position is adjustable with respect to the structure 9 and the axis 15 can be turned with respect to the axis 5 and, thus, the air flow can be directed towards the outlet 7, regardless of whether said air flow is concentrated or diffused. In particular, at least part of the seat 13 and at least part of the external surface of the collar 32 have a spherical cap shape so as to define a ball joint, which permits the rotation of the collar 32 and, thus, of the member 8, in any direction.

Preferably, the hinge seats 30 are defined by respective recesses, made in a front edge of the collar 32, and closed at the front by a ring 33 which is coaxial with the collar 32 and fixed to the latter in a known way that is not described in detail.

According to an alternative embodiment that is not shown, there is no collar 32 and the member 8 is coupled directly to the portion 11, so that the air outflow axis, i.e. the axis 15 cannot be turned and said flow can only be configured as concentrated or diffused.

Appropriate retaining means, for example appropriate friction couplings, are then envisaged to hold the member 32 in a fixed but releasable position about the axis 28 and thus prevent the member 8 from randomly and/or undesirably moving between the first and the second configuration.

From the above description it is evident that owing to the characteristics of the member 8 it is possible to obtain a concentrated air flow or a diffused air flow according to the position of said member 8 about the axis 28 and, at the same time, without excessively obstructing the outflow of air. Indeed, having a series of air ducts 23 arranged along concentric annuli and cascaded along the axis 15 improves the outflow conditions compared to the solutions known in the prior art.

The arrangement and/or the shape of the walls 18, 19, 20 and 21, which axially overlap one another in a partial and progressive manner, also helps to guide the air flow better, without penalising one of the two configurations with respect to the other.

The member 8 is relatively easy to handle and manoeuvre, its overall dimensions are no bigger than those of the air outlet devices known in the prior art and, moreover, it has an aesthetically pleasing design.

Other advantages have been described above and/or will be apparent to the person skilled in the art based on the characteristics described and illustrated herein.

Lastly, from the above description, it is clear that modifications and variations may be made to the air outlet device 1 described and illustrated herein without departing from the scope of the present invention as set forth in the appended claims.

In particular, the number of walls that axially delimit the air ducts 23 could be other than four; or the air ducts 23 could be defined by deflector portions differing from the walls 18, 19, 20 and 21 and the spokes 25 in terms of their shape and/or position; and/or the air duct 16 could be blind at the tip of the substantially cone-shaped or pyramid-shaped structure.

Furthermore, the shape of the air ducts 23 could differ from that shown in the accompanying figures; for example, the radially internal end openings of the air ducts 23 could be arranged in an axial direction and parallel to one another at an end of the member 8, without the presence of the air duct 16; and/or the spokes 25 could be smaller and/or shorter, so that the radially internal and/or radially external end openings of the air ducts 23 could be continuous rings and not divided into sectors by the spokes 25.

The invention claimed is:

1. An air outlet device comprising:
   a supporting structure suitable for communicating, in use, with an air ventilation system:
   an outlet member configured to emit an air flow along an outlet axis;
   a coupling device which couples said outlet member to said supporting structure and comprises at least one joint element configured so as to permit a rotation of said outlet member by 180° about a joint axis orthogonal to said outlet axis, so that said outlet member can be placed in two opposite configurations;
   said outlet member comprising at least two deflecting walls, which are ring-shaped, are coaxial and axially spaced with respect to one another along said outlet axis, and define a plurality of air ducts; the air ducts extending about said outlet axis and being arranged axially in sequence with respect to one another; said deflecting walls having shapes and/or positions such as to guide the air in said air ducts along guiding directions, each having at least a radial component;
   wherein each of said deflecting walls have a respective series of through holes disposed in positions that are spaced apart about said outlet axis; the holes in each of said deflecting walls being rotationally staggered about the outlet axis with respect to the holes in an adjacent deflecting wall of the deflecting walls; and
   wherein said outlet member further comprises at least one protruding tab, which protrudes axially from one of said deflecting walls at an axial end of said outlet member.

2. The air outlet device as claimed in claim 1, wherein said deflecting walls further define a central axial air duct; said air ducts having respective radially internal end openings which lead into said central axial air duct.

3. The air outlet device as claimed in claim 2, wherein said central axial air duct is open at both axial ends of said outlet member.

4. The air outlet device as claimed in claim 1, wherein said deflecting walls are shaped as circular rings.

5. The air outlet device as claimed in claim 4, wherein at least one of said deflecting walls comprises an external perimeter area that directly faces, parallel to said outlet axis, an internal perimeter area of the adjacent deflecting wall.

6. The air outlet device as claimed in claim 5, wherein:
   the at least two deflecting walls comprise a first, a second and at least a third wall;
   said second wall comprises:
   a) an external perimeter area that directly faces, parallel to said outlet axis, an internal perimeter area of said first wall;
   b) an internal perimeter area that directly faces, parallel to said outlet axis, an external perimeter area of said third wall.

7. The air outlet device as claimed in claim 1, wherein at least one of said deflecting walls is sloping or tapered with respect to said outlet axis.

8. The air outlet device as claimed in claim 1, further comprising a plurality of spokes which join said deflecting walls to one another.

9. The air outlet device as claimed in claim 1, wherein said at least one joint element is defined by two hinge elements which are part of said outlet member and are arranged in positions which are diametrically opposite one another along said joint axis.

10. The air outlet device as claimed in claim 1, wherein said coupling device comprises a collar that is rotatingly coupled to said supporting structure so as to adjust the direction of said outlet axis and coupled to said outlet member by said at least one joint element.

11. The air outlet device as claimed in claim 10, wherein said collar is coupled to said supporting structure by means of a ball joint.

* * * * *